Nov. 28, 1933.     E. F. W. ALEXANDERSON     1,937,378
SOUND MOTION PICTURE PRODUCER
Filed May 2, 1933
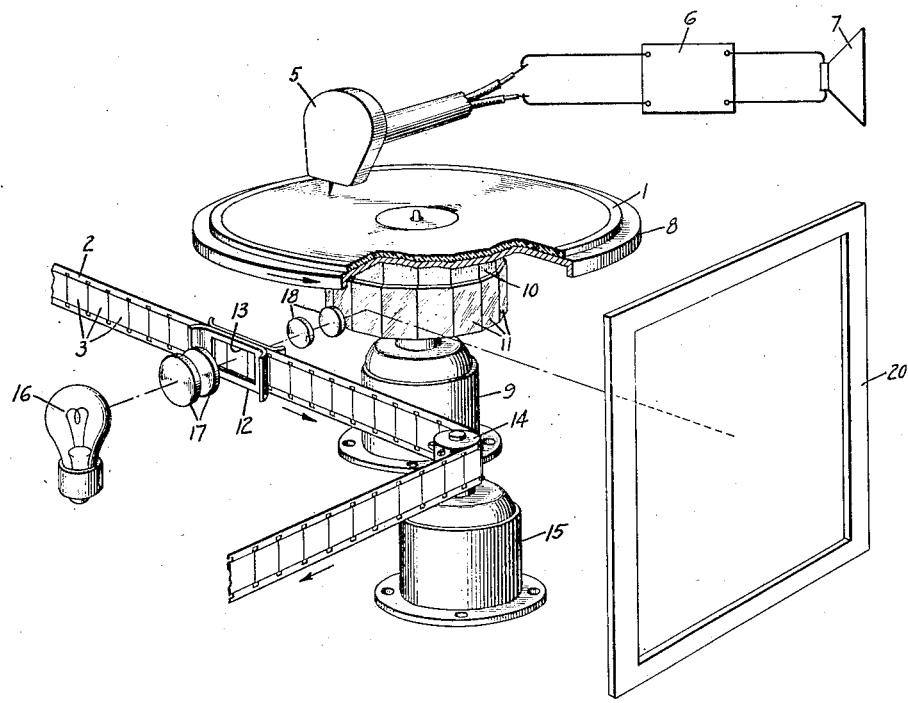
Inventor:
Ernst F.W. Alexanderson,
by Charles E. ?
His Attorney.

Patented Nov. 28, 1933

1,937,378

UNITED STATES PATENT OFFICE 1,937,378

SOUND-MOTION PICTURE PRODUCER

Ernst F. W. Alexanderson, Schenectady, N. Y., assignor to General Electric Company, a corporation of New York Application May 2, 1933. Serial No. 668,999

4 Claims. (Cl. 88—16.2)

My invention relates to apparatus for producing sound accompanied motion pictures, the sound and picture records having separate carriers which are operated in the proper synchronism. It is the object of my invention to provide improved apparatus of this character which is extremely simple in construction, is reliable in operation and is inexpensive to manufacture.

In the single figure of the drawing which is a perspective view illustrating one embodiment of my invention the sound record is on the phonograph disc 1 of well known form and the picture record is on the film 2. The latter also is of well known form with the exception that the pictures 3 are at right angles to the pictures in the usual motion picture film, that is, the pictures appear upright when the film is held horizontally. The sound recorded on the phonograph disc 1 may be reproduced by any well known apparatus. In the drawing I have shown such apparatus as comprising the electromagnetic pick-up 5, the amplifier 6, and the loud speaker 7. The phonograph disc 1 is supported on the turntable 8 which is secured to the shaft of the constant speed motor 9, such for example as a synchronous motor, which as shown is arranged to stand vertically whereby the pick-up 5 is held by gravity in the usual manner against the phonograph record. Depending from the turntable 8 is the drum 10 whose periphery has a series of plane faces forming a regular polygon. On each of these faces is secured a mirror 11.

Adjacent the mirror drum 10 are guides constituting the gate 12 for the film, which gate is provided with the usual light opening 13. The film is driven at a uniform speed by a sprocket 14 on the shaft of the constant speed motor 15 which preferably is a synchronous motor operated from the same circuit as motor 9. Light from the lamp 16 is condensed by the lenses 17 on the film in the gate opening 13 and between the gate and the mirror drum is the objective comprising lenses 18. Arranged in the path of the light reflected by the successive mirrors 11 is the screen 20 which preferably is translucent so that the image produced thereon may be seen upon the side opposite to that of the apparatus. It will be understood that the speed of the film is properly related to the speed of the mirrors such that a mirror sweeps through the light beam each time a picture passes the gate, the movement of the mirrors serving to compensate for the movement of the film to produce stationary pictures on the screen. It will also be understood that in making the phonograph record the disc should be rotated at the same speed at which it is to be rotated in the reproducing apparatus described above. For driving the disc and the film I prefer to use synchronous motors of the hysteresis type as by so doing it becomes a relatively simple matter to produce the proper synchronization of the sound and picture records for one needs merely to slightly increase the load on either motor, as for example by holding a finger against the turntable or against the film to cause the motor associated with that part to slip slightly.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent in the United States is:

1. Sound-motion picture apparatus comprising a turntable adapted to support a phonograph record, sound reproducing means arranged to engage said record, means for rotating said turntable, a series of reflectors secured to said turntable, means for moving a motion picture carrier synchronously with said turntable, a screen and means including said reflectors for projecting the successive pictures of said carrier on said screen.

2. Sound-motion picture apparatus comprising a turnable adapted to support a phonograph record, sound reproducing means arranged to engage said record, means for rotating said turntable, a drum secured to said turntable and having a series of mirrors on its periphery, means for moving a motion picture carrier synchronously with said turntable, a sceen and optical means including the mirrors of said series for projecting the images of the successive pictures of said carrier on said screen.

3. Sound-motion picture apparatus comprising a turntable adapted to support a phonograph record, sound reproducing means arranged to engage said record, means for rotating said turntable, a drum depending from and concentric with said turntable, a series of similar mirrors on the periphery of the drum, means for supporting a motion picture film opposite said drum, means for moving the film synchronously with the turntable, a light source, focusing means for projecting light therefrom through the successive pictures onto the successive mirrors and a screen arranged to receive the images reflected by said mirrors.

4. Sound-motion picture apparatus comprising a synchronous motor, a turntable mounted on the shaft thereof adapted to support a phonograph record, sound reproducing means arranged to engage said record, said turntable having a depending drum provided with a series of similar mirrors secured to the periphery thereof, means comprising a gate for supporting a motion picture film adjacent to the drum, a synchronous motor arranged to move said film, picture projecting means associated with said gate and cooperating with the respective mirrors and an image receiving screen arranged in the path of light reflected by the mirrors.

ERNST F. W. ALEXANDERSON.